UNITED STATES PATENT OFFICE.

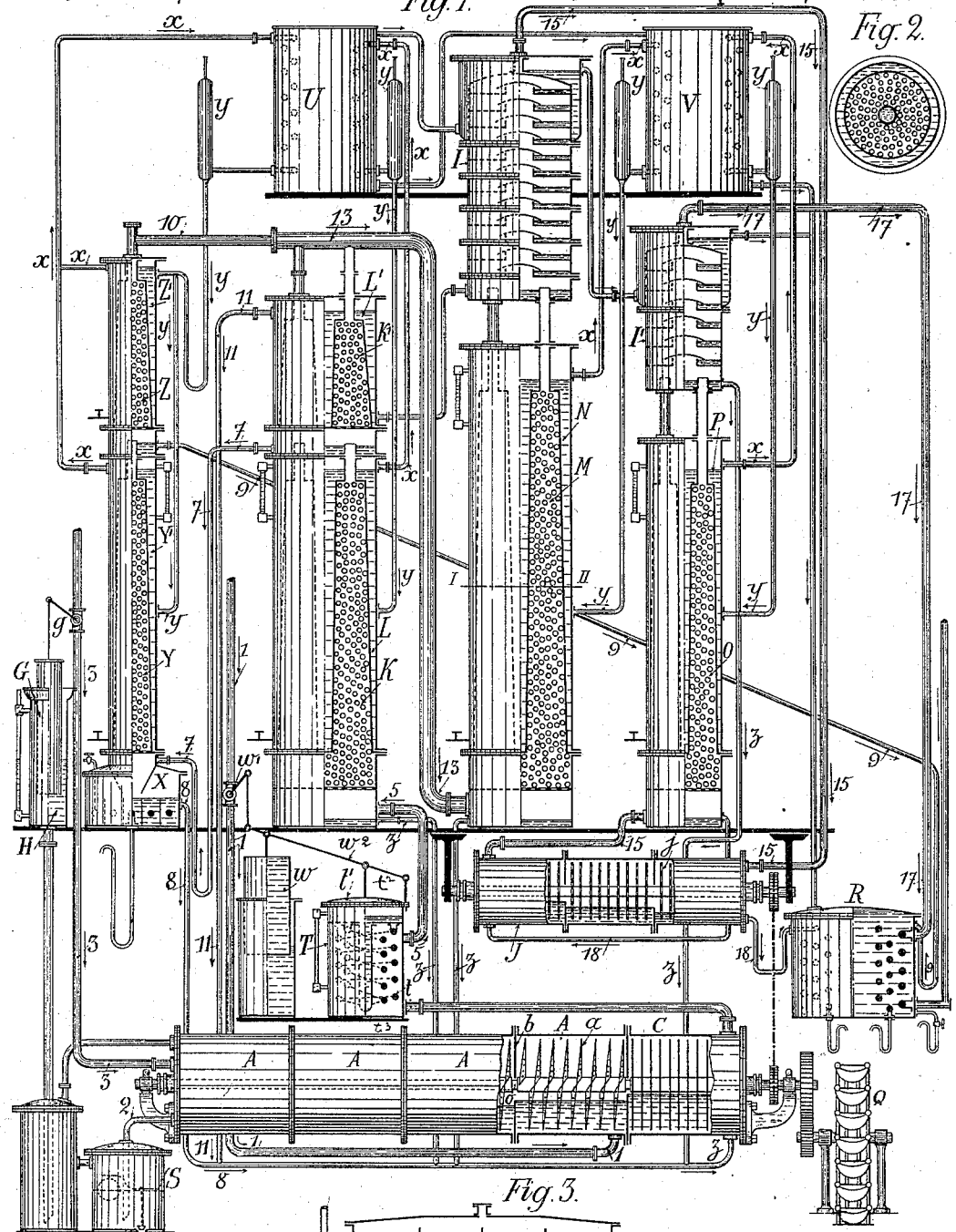

ODILON PERRIER, OF PARIS, FRANCE.

PROCESS OF AND APPARATUS FOR FRACTIONAL DISTILLATION OF ALCOHOL, &c.

SPECIFICATION forming part of Letters Patent No. 537,786, dated April 16, 1895.

Application filed June 7, 1894. Serial No. 513,809. (No model.) Patented in France March 21, 1890, No. 204,506, and April 7, 1893, No. 229,193; in Belgium August 7, 1891, No. 95,931; in England August 14, 1891, No. 13,729; in Germany September 4, 1891, No. 67,201; in Austria-Hungary October 2, 1891, No. 46,478; in Russia October 9, 1891, No. 14,120; in Switzerland November 7, 1891, No. 4,516; in Italy November 12, 1891, No. 30,731, and in Spain December 14, 1891, No. 12,686.

*To all whom it may concern:*

Be it known that I, ODILON PERRIER, a citizen of the Republic of France, residing in Paris, in the Republic of France, have invented certain new and useful Improvements in Processes of and Apparatus for the Fractional Distillation and Rectification of Alcohols, (for which Letters Patent were granted to me in the following countries: Switzerland, No. 4,516, dated November 7, 1891; Italy, No. 30,731, dated November 12, 1891; Spain, No. 12,686, dated December 14, 1891; France, No. 204,506, dated March 21, 1890, and No. 229,193, dated April 7, 1893; Belgium, No. 95,931, dated August 7, 1891; England, No. 13,729, dated August 14, 1891; Germany, No. 67,201, dated September 4, 1891; Austria-Hungary, No. 46,478, dated October 2, 1891, and Russia, No. 14,120, dated October 9, 1891,) of which the following is a specification.

This invention has reference to a process and an apparatus by means of which it is possible to effect in one single operation and at the first distilling the rectification of the alcoholic products thrown off by fermented worts. To this end the vapors produced during distillation are made to pass through successive analyzers, which effect the fractional condensation and the analysis of the vapors, in an automatic and continuous manner. These analyzers present the following distinctive characteristics: First, they divide *ad infinitum* the current of the vapors as well as that of the condensed liquids; second, thus reduced to a state of extreme division, the fluids (liquids and vapors) are maintained in this direct and intimate contact during a sufficiently long time to permit of the analysis of the vapors; third, they assign to each molecule of vapor coming out of the analyzer a uniform and automatically invariable temperature.

The analyzing condensers which I construct for this purpose consist of one or several chambers containing separating bodies, such as spheroidal beads made of porcelain or other unchangeable substances, around or above which are disposed condensing baths having a uniform and constant temperature. The alcoholic vapors which it is intended to reduce fractionally are separated *ad infinitum* as they pass through these chambers where the beads are situated; and by contact with the walls of the condenser partial condensation of these vapors occurs, and the liquids resulting therefrom being poured over the beads are reabsorbed into the interstices which are left among them and which are thus simultaneously occupied by the vapors and their condensed products. The vapors are thus exposed throughout their entire course to contact with their condensed liquids, which stream over the periphery of these beads immersed in the vapor, and this molecular contact results in the analysis of the vapors; but in order that the analysis of the different volatile products composing the current of vapor may be effected, and in order that it may be exactly suited to each of the products to be reduced fractionally, it is necessary to limit the degree of heat of each of the analyzers, so as to obtain in the most exact manner the temperature at which each molecule of vapor shall be treated. This is the purpose of the baths having uniform and invariable temperature, their fixity of heat being obtained by applying the following law of physics: When a liquid is brought to a state of ebullition it preserves an invariable degree of heat so long as its composition and the ambient pressure remain constant; and this whatever variations may occur in the intensity of heat applied. Relying upon this known principle, I compose my condensing baths of liquids which enter into a state of ebullition at the exact temperatures that I wish to assign to each condenser; and this point of ebullition being once fixed the degree of heat in the bath remains automatically invariable throughout the whole process of distillation.

The temperatures which enable me to fractionally reduce the alcoholic vapors being below 212° Fahrenheit, I use in the composition of the baths mixtures of water, alcohol and methylene; but the nature of the agents being immaterial, inasmuch as the stability of the boiling point is the only object, any other product would give the same results.

The boiling points of the condensing baths are at progressively decreasing but always invariable temperatures in each one of them, so that the alcoholic vapors which pass through these different analyzers are in turn submitted to progressively decreasing degrees of heat and to a lowering of temperature which is invariable as between one analyzer and another. By virtue of this arrangement, first, the condensing bath at invariable temperature gives to the vapors a fixed and invariable degree of heat in each analyzer; second, this cooling brings about the condensation of the less volatile products, which, moistening the beads, contributes not only to an exchange of caloric units between the condensed liquids and the vapors thus exposed to direct and molecular contact, but moreover allows the liquids to expend their dissolving power upon the vapors and thus resist the gaseous diffusion of the less volatile products which give off vapors at all temperatures. Such is the work of condensation and analysis which goes on continuously, automatically and indefinitely in each analyzer, enabling me to classify the different volatile products and extract them separately.

Before entering upon the description of the apparatus, it remains for me to describe a process of distillation, that is to say of production of vapors applying just as much to thin worts as to thick ones, inasmuch as it does away with the deposits, the obstructions and the stoppages which result from the concentration of the worts in process of distillation.

I use, principally in the case of thick worts, horizontal columns (they might be placed in an inclined position), formed of sections separated from one another by overfall partitions. An actuating shaft carrying perforated helicoidal blades or screws passes lengthwise through the column, and by its continuous rotary motion works up the liquid and keeps the foreign bodies in suspension. By reason of the peculiar inclination of the blades of the screws the liquid is constantly forced toward the outlet pipe. The slow and continuous motion communicated to the screws consequently tends to drive from one compartment to another the bodies in suspension, to sort them and rapidly expel them, thus obtaining in the column a liquid always clearer than that which comes in.

In order to better explain my invention, I have in the annexed design diagrammatically represented one of the arrangements which realizes for industrial purposes the fractional reduction and continuous rectification of alcohols. I have taken the case of the horizontal column, which applies indifferently to all kinds of worts, clear or thick; but my processes for analysis and fractional reduction do not depend upon the construction of the column, which may be a vertical column with trays of any kind. In this design the same reference letters refer to the same parts in all the figures.

Figure 1 is a diagrammatic view of the apparatus as a whole in the case where I use vertical analyzers. Fig. 2 is a horizontal section showing the internal configuration of a horizontal analyzer. Fig. 3 is a vertical section of a horizontal analyzer.

The apparatus for distilling and rectifying alcoholic vapors consists of—

First. A horizontal distilling column A, divided into several compartments or sections by vertical partitions $b$ having each an opening in the center forming an overfall, thus limiting the level of the liquid in each compartment. Throughout the length of this column passes a rotary shaft $o$, upon which are mounted perforated helicoidal blades or screws $a$. This shaft rotates in such a manner that the blades $a$ constantly drive the liquid toward the opening 2, so that the solid bodies kept in suspension by the action of the blades are also driven forward owing to the inclination given to the spirals. By reason of the slow and continuous motion of the blades $a$ the more fluid portions retrograde, thus keeping the level of the liquid constant in each compartment, while the muddy portions, being unable to escape the propulsive action of the blades, accumulate in the swirling eddies which are produced against the partition $b$ and are the first to be driven from one compartment to another. As to the vapors, they must of necessity come toward the shaft $o$, in order to pass from one compartment to another. This arrangement of the column moreover offers the best conditions for volatilization and extraction. In fact, the liquid being raised up by the perforated screws $a$ trickles down again in thin and continuous sheets on direct contact with the heating vapor or steam that is supplied to the distilling apparatus through the pipe 3. Uniformity of temperature is rapidly produced as between the fluids brought together and the exchange of calorics thus induced facilitates the prompt and complete extraction of the alcoholic principles contained in the wine, without necessitating so large an expenditure of steam for heating. Moreover, as the overfall openings in the partitions $b$ keep the liquids at levels which gradually decrease as between one compartment and another, it follows that in proportion as the alcoholic liquid draws nearer to the outlet pipe 2 it is progressively exposed in smaller and smaller volume to the action of a larger and larger and hotter and hotter body of vapor. Finally, let it be observed that as to those vapors which circulate in a contrary direction from the wine, their forward progress is hindered by the peculiar motion of the blades, and that in the continual backward recoil which the inclination of the spirals tends to give them they are thus carried over the faces of the blades which are wet with alcoholic liquid continually renewed. The course of the fluids being a regular one, the vapors are rapidly saturated without the necessity of having recourse to the counter-pressure and high temperatures involved in ordinary processes where a vapor is forced through a liquid, with consequent mechanical priming. In the compartment C, to which the wine does not have access, but only the liquids retrograded and now free from foreign bodies in suspension, the screws may be replaced by simple perforated disks. I can use one or several horizontal distilling columns A C.

Second. A series of analyzers, K, K', M, O, Y, Z, submerged in their respective condensing baths, L, L', N, P, Y', Z'. These analyzers are composed of a double metallic envelope, cylindrical or prismatic, between the thicknesses of which are placed one or several chambers containing beads.

Third. Two condensers, U, V, destined to effect the condensation of the vapors emitted by the constant temperature baths L, L', N, P, Y', Z'. These constant temperature baths, as hereinbefore stated are composed of liquids whose boiling points are at the exact temperatures assigned for the several condensers. The boiling point of each is invariable, but the boiling points of the successive baths are at progressively decreasing temperatures as between one another. The pipes $x$ from the several condensers lead the vapors emitted by the baths into the coolers U, V; and from the coolers these condensed vapors are returned to their several baths by pipes $y$. In this way the bath is maintained practically a stagnant liquid which is kept at its invariable boiling point by the actual current of the vapors in process of distillation.

Fourth. A cooler, R, which cools the various products that have been fractionally reduced.

Fifth. Two series of washing trays, I and I'.

Sixth. A feed regulator, T, to regulate the supply of the worts.

Seventh. A pressure regulator, G, H, acting on the valve which admits the heating steam $g$, consisting of a float connected to the valve and contained in a tank filled with liquid and supported by a stand pipe through which the tank communicates with a lower tank, which communicates with a pipe leading from the steam or vapor space in the vessel A. Variations in steam pressure in the vessel A will cause corresponding variations in the level of the liquid in the float containing tank, and the float therein will be raised or lowered as the case may be thereby affecting the steam valve $g$.

In order to better explain the functions of each part of the apparatus I will now describe its working and trace the progress of the fluids.

*Progress of the fermented worts.*—The fermented wort or wine penetrates into the column A by the pipe 1. It is subjected to the mashing and propulsive action of the perforated helicoidal blades $a$, which cause it to everflow progressively from one compartment to another, until it reaches the outlet pipe 2. It then penetrates into the automatic purger with constant level, S, which expels the residuary liquors from the apparatus by the opening 5.

*Progress of the vapors.*—The steam enters through the tube 3 into the column A. They extract the alcoholic principles of the wine, gather alcoholic vapors by their multiplied and direct contact with liquids which grow progressively richer and richer in alcohol, firstly, the wine in the compartments A; secondly, the retrograded products in the compartments C. The alcoholic vapors next escape from the column A C and pass to and through the sensitive organ T of the feed regulator. This device consists of an upper chamber $t^2$ hermetically sealed from a lower chamber $t^3$, and provided with one or more worms $t$ or similar contrivances which extend down into the lower chamber $t^3$ so as to be subjected to the action of the heated alcoholic vapors, which pass through the lower chamber on their way to the analyzer K. The upper hermetically sealed chamber contains a stated quantity of a more or less volatile liquid such for example as water containing any desired percentage of alcohol. This liquid by the heat of the alcoholic vapors, is caused to expand or vaporize and thus to act upon the flexible membrane or diaphragm $t'$ which closes the top of chamber $t^2$. Variations in temperature will thus produce oscillation of the diaphragm which through a system of levers and connecting rods $w^2$ of any suitable kind (one of the members of which is attached to the diaphragm) is transmitted to the valve $w'$ upon the pipe 1 through which the wines are admitted to the distilling column. In this way the feed is automatically regulated. The vapors coming from the member T are directed through the tube 5 upon the first group of analyzers, K, which lowers their temperatures to a point determined by the constant temperature bath L. The vapors next pass into the second group of analyzers, said group being called the "amylic catcher," K', which eliminates by the tube 7 the condensed products and takes them either into a special resting chamber, so as to concentrate them separately later on, or into an additional group of analyzers, X, Y, Z, which permits of their immediate concentration. The retrograded liquid passes in this latter case through the tube 7 into a boiler, X, and the volatilized products are fractionally reduced in the groups of analyzers Y and Z. The aqueous products are the first to be condensed in Y and fall back into X, whence the overflow pipe 8 brings them back into the horizontal distilling column C. The amylic and alcoholic products are enabled to reach the analyzer Z, which retrogrades the amylic products and takes them through the tube 9 into a cooling worm set up in R, from which they are gathered, while the more volatile alcohol passes through this analyzer, owing to the high temperature which is maintained therein by the constant temperature bath Z'. The alcohol escapes in a state of vapor by the pipe 10, which returns it through 13 into the general circulation. The alcoholic vapors which are left in K' are conducted through 13 into the group of analyzers M N, which by reason of the boiling point assigned to the constant temperature bath N subjects them to the lowering of temperature desired in order to obtain the required alcoholic strength. The alcoholic vapors next pass through the washer I, in which, owing to the dissolving power of the purified and boiling alcohol, the last traces of the products less volatile than the alcohol are arrested. Thus purified, the vapors pass through 15 into the last group of analyzers O P, either directly or after passing through an analyzer represented in the design by the horizontal column with perforated rotating disks, J, according to the degree of purity which is sought to be given to the alcohol. The group of analyzers O P condenses the alcohol, but the temperature maintained therein by the invariable temperature bath (about 158° Fahrenheit) is too high to allow the aldehydes and other products that distill first to condense. These latter products therefore remain kept in a state of gaseous tension. They pass through the washer I', to which they yield the alcohol carried along by gaseous diffusion, and go by the pipe 17 to be condensed in the special worm which is reserved for them in R. As to the alcohol condensed in O P, it is taken through the pipe 18 into one of the worms of R, to be there cooled and extracted.

When it is desired to obtain alcohols absolutely free from all traces of aldehydic products, the alcohol condensed in O P is carried through the pipe 18 into the horizontal column J. It is then subjected to the action of the perforated disks therein which raise it up and expose it in a continuous stream to contact with the vapors that are going into the analyzer O P. This ventilation frees the boiling alcohol from all traces of more volatile products.

Escape pipes $x$ allow the vapors emitted by the constant temperature baths Y, L, N, P, to reach to and be condensed in the coolers U and V, while the tubes $y$ immediately bring back the condensed liquids to their original baths.

The pipes $z$ bring back to the horizontal distilling column C the alcoholic products retrograded from the various analyzers.

The analyzers which I have represented as arranged vertically may also be arranged horizontally, thus proportionately diminishing the height of the buildings. Fig. 3 exhibits this arrangement. The rectangular chamber D is made up of superposed chambers containing alternately beads giving passage to the alcoholic vapors and tubular or other reservoirs containing the constant temperature baths. The walls of the condensers are smooth or corrugated. They act as checks, and the vapors are forced to pass horizontally into each compartment. The speed of their ascent is thus diminished; and the partial condensation effected on contact with the condensing wall forces them moreover to circulate all around the beads wet with liquid. The alcoholic vapors which are to be reduced fractionally enter by the pipe D', pass along the horizontal or inclined walls of the baths, which limit the lowering of their temperature. They are broken and disintegrated *ad infinitum* in the tortuous passages which exist among the beads kept constantly wet, and they are analyzed by direct contact with the condensed liquids exposed in a molecular state. They escape by D''. As will be seen, the process here is the same as that carried on in the vertical analyzers.

By the foregoing process of distillation I effect in one continuous operation the automatic fractional distillation of volatile products. Under this process, these products in a state of heated vapor, are caused to pass through or in contact with successive condensers kept at temperatures progressively decreasing as between one condenser and the next but uniform and invariable as regards any particular one of them. Each of these condensers is a closed compartment containing a distinct condensing liquid whose boiling point is known and determined in advance. This liquid is brought to and maintained at its boiling point automatically by the current of heated vapors passing through or in contact with the condenser; and each condenser is connected with a distinct cooler by which the vapors as they are given off by the condensing bath are condensed and returned at once to the condensing bath. In connection with each condenser I use what I have termed an analyzer by their passage through which the vapors are reduced to molecular state for the purpose of facilitating the distilling operation.

In the apparatus which I make use of to effect the preliminary reduction of the volatile products to vapor, the paddles raise the liquid and expose it under most favorable conditions to the entering steam or heating vapor; and owing to their helicoidal shape these paddles tend to constantly drive the sediment or muddy part of the liquid toward the exit and to expel it therefrom.

The use in this apparatus of partitions progressively decreasing in height as between one partition and the next toward the steam inlet end, thus maintaining the liquid at corresponding decreasing levels in the several compartments of the column, is for a two fold purpose, viz., to prevent the liquid from flowing backward, and thus avoid the mixing of liquids unequally exhausted; and to expose the liquid in smaller and smaller volume to progressive contact with vapors which become progressively hotter and of greater volume.

By the automatic regulation of the feed as hereinbefore described, the current of alcoholic vapors is maintained at a practically constant temperature, thus insuring a regular alcoholic yield from the apparatus, and the regular and uniform exhaustion of the residuary liquors.

Having thus described my invention, what I claim herein as new, and desire to secure by Letters Patent, is as follows:

1. The process herein described of effecting in one continuous operation the automatic fractional distillation of volatile products, consisting in reducing these products to a state of heated vapor and then subjecting said heated vapor in its passage through successive condensers, to the action of distinct condensing liquids of progressively decreasing temperatures contained in said condensers, each liquid (contained in its appropriate condenser) having a definite boiling point which is higher than that of the condensing liquid next to act on the vapor, and being automatically brought to its boiling point by the heat of the current of volatile vapor acted on by it, the vapor given off by each condensing liquid being cooled and condensed, and then returned to that liquid, substantially as and for the purposes hereinbefore set forth.

2. The process of effecting in one continuous operation, the automatic fractional distillation of volatile products, consisting in reducing these products to a state of heated vapor and then finely dividing or reducing to molecular state said heated vapor and subjecting it in this condition to the action of distinct condensing liquids contained in condensers of progressively decreasing temperatures as between one another, through which condensers, the vapor is caused to pass, each condensing liquid having a predetermined boiling point which is higher than that of the condensing liquid in the condenser through which the vapor next passes, and being automatically brought to and maintained at its boiling point by the heat of the current of volatile vapor acted on by it, the vapor given off by each condensing liquid being cooled and condensed and returned to that liquid, substantially as and for the purpose hereinbefore set forth.

3. The apparatus for preliminarily vaporizing the volatile products, consisting of a chamber having suitable inlet passages for the heating agent and volatile products to be vaporized, and outlet for the vapor produced, the inlet for the heating agent being at or near one end, and the inlet for the products to be vaporized being at or near the other end of said chamber in combination with partitions of progressively increasing height as they depart from the heating agent inlet, dividing the chamber into a series of sections, or compartments and a rotary shaft extending lengthwise of the chamber and armed with helicoidal paddles or blades, under the arrangement and for the joint operation substantially as hereinbefore set forth.

In testimony whereof I have hereunto set my hand, before two subscribing witnesses, this 17th day of May, A. D. 1894.

ODILON PERRIER.

Witnesses:
J. L. KNUBLEY,
F. T. S. FULLER.